(12) United States Patent
Teboulle

(10) Patent No.: US 12,656,161 B2

(45) Date of Patent: Jun. 16, 2026

(54) AC SUPPLY FLUID METER

(71) Applicant: SAGEMCOM ENERGY & TELECOM SAS, Bois-Colombes (FR)

(72) Inventor: Henri Teboulle, Bois-Colombes (FR)

(73) Assignee: SAGEMCOM ENERGY & TELECOM SAS, Bois-Colombes (FR)

( * ) Notice: Subject to any disclaimer, the term of this patent is extended or adjusted under 35 U.S.C. 154(b) by 123 days.

(21) Appl. No.: 18/516,856

(22) Filed: Nov. 21, 2023

(65) Prior Publication Data

US 2025/0164302 A1 May 22, 2025

(30) Foreign Application Priority Data

Nov. 23, 2022 (FR) ...................................... 2212218

(51) Int. Cl.
| | |
|---|---|
| *G01F 15/06* | (2022.01) |
| *G01F 15/00* | (2006.01) |

(Continued)

(52) U.S. Cl.
CPC .............. *G01F 15/06* (2013.01); *G01F 15/00* (2013.01); *G01F 15/068* (2013.01);

(Continued)

(58) Field of Classification Search
CPC ........ G01F 15/06; G01F 15/00; G01F 15/068; G01F 1/66; G01N 29/222; H02J 7/0048;

(Continued)

(56) References Cited

U.S. PATENT DOCUMENTS

| | | | |
|---|---|---|---|
| 8,299,937 B2 | 10/2012 | Wang et al. | |
| 2017/0059384 A1* | 3/2017 | Della-Monica | ........... B05B 1/18 |
| 2017/0074914 A1* | 3/2017 | Condorelli | ............. G01R 27/26 |

FOREIGN PATENT DOCUMENTS

| | | |
|---|---|---|
| CN | 204043740 U | 12/2014 |
| CN | 112689933 A | 4/2021 |

(Continued)

OTHER PUBLICATIONS

Chinese Office Action and Search Report for Chinese Application No. 202311572430.6, dated Jan. 29, 2025, with English translation. Search Report Issued in FR 2212218, dated May 17, 2023.

(Continued)

*Primary Examiner* — Benjamin R Schmitt

(74) *Attorney, Agent, or Firm* — Birch, Stewart, Kolasch & Birch, LLP

(57) ABSTRACT

A fluid meter including an electric generator, a metrological sensor, a control block, a power supply block coupled to the electric generator, and configured to supply energy to the control block, in which the power supply block includes a first supply path includes at least one primary cell, and a second supply path connected to the electric generator, including a capacitor and a first switch configured to selectively couple the capacitor and the electric generator, the power supply block including a second switch configured to selectively couple the first supply path or the second supply path to the control block, the power supply block further including a current sensor determining a current measurement, the first switch and the second switch being monitored according to a state of charge of the capacitor determined from the current measurement.

11 Claims, 2 Drawing Sheets

(51) Int. Cl.

| | |
|---|---|
| *H02J 7/00* | (2006.01) |
| *H02J 7/14* | (2006.01) |
| *H02J 7/34* | (2006.01) |
| *G01F 1/66* | (2022.01) |
| *G01N 29/22* | (2006.01) |
| *H02J 9/08* | (2006.01) |

(52) U.S. Cl.
CPC .......... *H02J 7/0048* (2020.01); *H02J 7/1415* (2013.01); *H02J 7/345* (2013.01); *G01F 1/66* (2013.01); *G01N 29/222* (2013.01); *H02J 9/08* (2013.01); *H02J 2207/50* (2020.01)

(58) Field of Classification Search
CPC ............ H02J 7/1415; H02J 7/345; H02J 9/08; H02J 2207/50
See application file for complete search history.

(56) References Cited

FOREIGN PATENT DOCUMENTS

| | | | |
|---|---|---|---|
| CN | 114924117 A | 8/2022 | |
| WO | WO-2015/150247 A1 | 10/2015 | |
| WO | WO-2019228921 A1 * | 12/2019 | ............ H02J 7/0069 |

OTHER PUBLICATIONS

Hao et al. "Development of a Digital and Battery-Free Smart Flowmeter" *Energies* 2014.
European Search Report issued in EP 23211649 dated Mar. 25, 2024.
Notification under Rule 71(3), European Application No. 23211649. 1, mailing date Aug. 1, 2024.
Decision to Grant 97(1), European Application No. 23211649.1, mailing date Nov. 14, 2024.

* cited by examiner

AC SUPPLY FLUID METER

CROSS REFERENCE TO RELATED APPLICATIONS

The benefit of priority to French Patent Application No. 2212218 filed Nov. 23, 2022, is hereby claimed and the disclosure is incorporated herein by reference in its entirety.

TECHNICAL FIELD

The invention belongs to the technical field of fluid meters. A fluid meter is a metrology apparatus configured to perform metrological measurements in a fluid circulation pipe. The fluid can be liquid such as for example water or oil, or gaseous such as for example a gaseous mixture of hydrocarbons mainly consisting of methane such as natural gas. Metrological measurements are generally a volume or a flow rate relating to the fluid circulating in the pipe.

TECHNOLOGICAL BACKGROUND

In order to know some metrological data regarding the circulation of a fluid in a pipe, a fluid meter is commonly used to generate and make metrological measurements available. In order to take these metrological measurements, fluid meters equipped with means for communicating information relating to said metrological data have been developed. These communication means can be adapted for a remote communication, and for example allow wired or non-wired transmission of this information. The communication means can also have several pieces of information in a display, organized according to menus. In all cases, these metrological meters require an electrical supply. However, the meters can be disposed in locations that do not allow easy connection to the electrical network, so that they must have an autonomous electrical supply, not connected to the electrical network.

The simplest way to autonomously supply electricity to a fluid meter is to equip it with an electric primary cell, that is to say a non-rechargeable energy storage element in situ. The energy storage capacity must however be sufficient to allow electrical supply for a long period of time (typically 20 years), which results in the use of very large primary cells. Furthermore, the service life of the primary cell depends on the electrical consumption of the meter, which can significantly reduce the service life of the primary cell, which in any case eventually runs out and must be changed, a tedious operation requiring monitoring of the state of the primary cell.

In order to overcome these drawbacks, it has been proposed to replace the electric primary cell with a rechargeable battery, for example powered by an electric generator configured to be driven by the circulation of the fluid in the pipe and generate electricity recharging the battery.

However, the potentially intermittent aspect of the circulation of the fluid requires having a battery with a significant electrical storage capacity, which results in bulk and high costs. Furthermore, the non-regularity of the fluid circulation episodes can multiply the incomplete charge-discharge cycles of the battery, reducing its performance over time.

Patent application WO2015150247 describes a method for operating an electronic device carried by an apparatus and apparatus equipped with a turbine able to be driven in rotation by a flow of a fluid and with a means for detecting at least a determined angular position of said turbine, delivering an electrical pulse each time the turbine passes through this angular position. A pulse counter can count the delivered pulses. An electric current generator can power the electronic device. An electric energy accumulator can be charged by the current generator and power the electronic device. However, this electric accumulator only works when current is generated. In order to have a supply during the shutdown of the turbine, the accumulator can be replaced by a primary cell, whose size must be all the greater as the shutdown periods are frequent or extended.

PRESENTATION OF THE INVENTION

The invention therefore aims to propose a fluid meter equipped with an electrical supply with a long service life, less bulky and more reliable.

To this end, the invention proposes a fluid meter configured to perform metrological measurements in a fluid circulation pipe and to communicate information relating to said metrological data, comprising:

- an electric generator configured to be driven by the circulation of the fluid in the fluid pipe and to generate electricity,
- at least one metrological sensor configured to perform metrological measurements in the fluid pipe,
- a control block configured to receive the metrological measurements and to communicate information relating to said metrological data,
- a power supply block coupled to the electric generator, and configured to supply energy to the control block, in which the power supply block comprises a first supply path comprising at least one primary cell, and a second supply path connected to the electric generator, the second supply path comprising a capacitor and a first switch configured to selectively couple the capacitor and the electric generator, the power supply block further comprising a second switch configured to selectively couple the first supply path or the second supply path to the control block, the power supply block further comprising a current sensor configured to determine a current measurement representative of an intensity of a charge or discharge current of the capacitor, the first switch and the second switch being configured to be monitored by the control block according to a state of charge of the capacitor determined by the control block from the current measurement.

Thanks to the supply alternately ensured by the first supply path and the second supply path, it is possible to permanently provide electricity to the control block while only requiring a primary cell of low storage capacity, less bulky, less expensive, with an extended service life.

Preferably, in order to favor the supply by the capacitor, the control block is configured, at least when the electric generator generates electricity: a) to open the first switch and position the second switch on the second supply path when the state of charge becomes greater than a high threshold, and b) to close the first switch and position the second switch on the first supply path when the state of charge of the capacitor becomes smaller than a low threshold.

The invention is advantageously supplemented by the following different characteristics taken alone or according to their different possible combinations:

- the high threshold is greater than or equal to 80% of a maximum state of charge, and the low threshold is less than or equal to 10% of a maximum state of charge;

the control block is configured to update a previous state of charge with a multiple of a square of the intensity of the current at each time step;

the control block is configured to update at each time step a previous state of charge with a product of the intensity of the current and of the voltage between a first terminal of the capacitor between the first switch and the second switch and the reference potential, said voltage being decremented by the voltage across the resistor by the intensity of the current;

the state of charge is expressed as a proportion of a maximum energy reserve of the capacitor;

the meter comprises a resistor in series between the capacitor and a reference voltage, and the measurement of the current is determined from a voltage across the resistor;

the capacitor has a terminal coupled to a terminal of the first switch and to a terminal of the second switch;

the communication of the information relating to the metrological data is performed by display on a screen and/or by transmission of said metrological data;

the first supply path and the second supply path are independent;

the primary cell is an electrical energy storage element that cannot be recharged or whose configuration in the power supply block makes the charging within this power supply block impossible.

PRESENTATION OF THE FIGURES

Other characteristics, aims and advantages of the invention will emerge from the following description, which is purely illustrative and not limiting, and which should be read in relation to the appended drawings in which.

DETAILED DESCRIPTION

Figure 1:
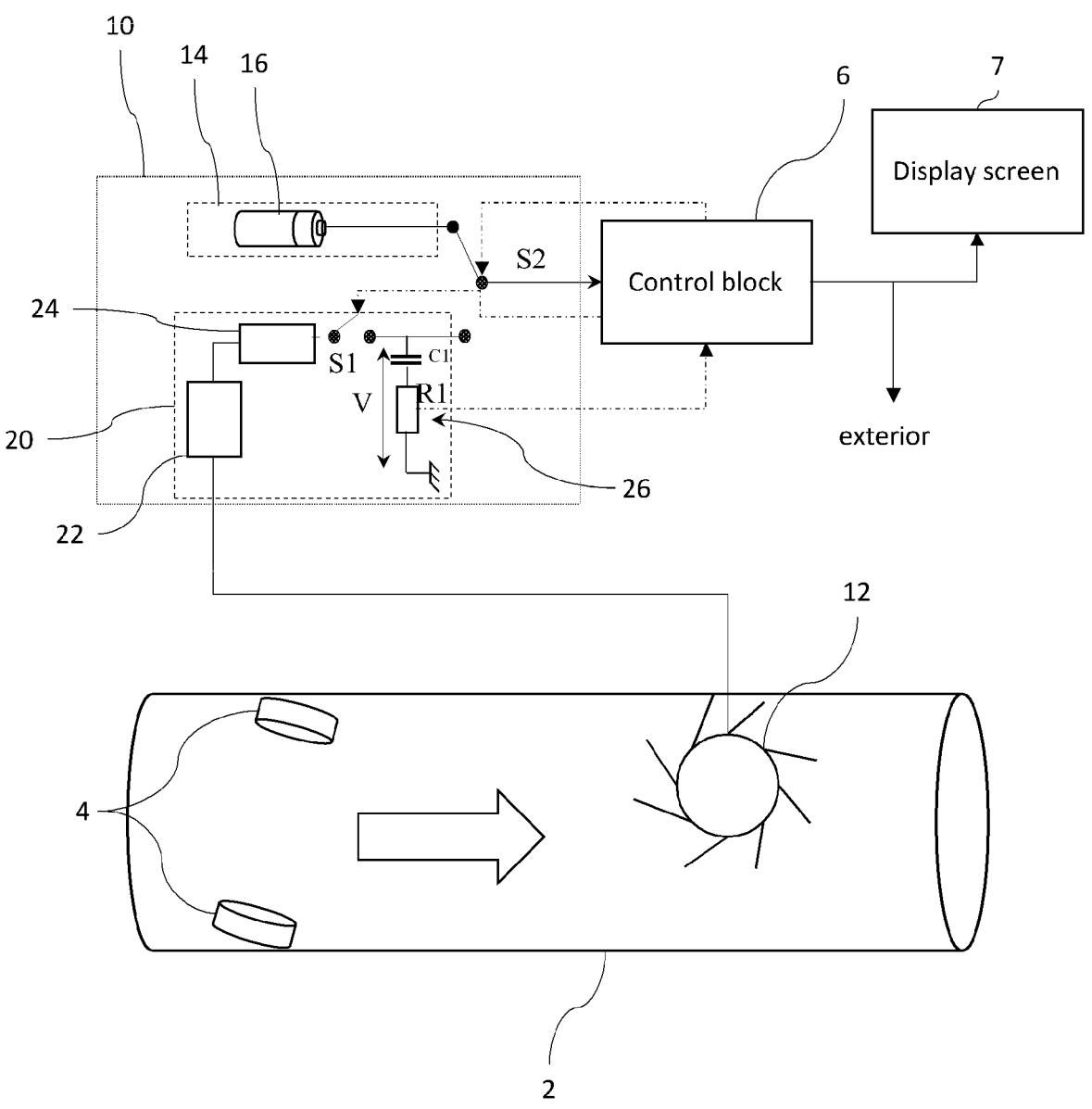
FIG. 1 is a schematic overview of a fluid meter according to one possible embodiment of the invention.

FIG. 1 shows a fluid meter configured to perform metrological measurements in a fluid circulation pipe 2 and to communicate information relating to said metrological data. Typically, the fluid circulation pipe 2 is part of the fluid meter in the sense that the fluid meter comprises a duct portion in which the fluid circulates, which is integrated into the fluid circulation network. To perform metrological measurements, the fluid meter comprises at least one metrological sensor 4 configured to perform metrological measurements in the fluid pipe 2. The metrological sensor 4 is preferably disposed in the fluid pipe 2. The type of metrological sensor 4 depends on the technology used to perform the measurements, which may be an ultrasonic, an electromagnetic, a thermal or a Coriolis technology. In the example illustrated, two ultrasonic transducers are disposed facing each other in the pipe in order to carry out metrological measurements by ultrasounds, in a known manner. The metrological measurements are generally a volume or a flow rate relating to the fluid circulating in the pipe 2, derived from the data collected by the metrological sensor(s) 4.

The fluid meter comprises a control block 6 comprising at least one processor and one memory, and which is configured to receive the metrological measurements coming from the metrological sensor 4, and to communicate the information relating to said metrological data. Typically, the metrological sensor 4 can be connected to the control block 6, for example by a wired link, and transmits the metrological measurements to the control block 6.

The communication of the information relating to the metrological data is performed by display on a screen and/or by transmission. The fluid meter can have a display screen 7 where the information relating to the metrological data can be displayed. The fluid meter can be equipped with a man-machine interface such as a button making it possible to cause the display of this information relating to the metrological data, and possibly to vary this display, for example by making it possible to scroll different types thereof on the display screen 7. The information relating to the metrological data can be transmitted outside the fluid meter, preferably by a non-wired link, in which case the fluid meter can comprise an antenna and any other known element making it possible to establish a remote communication with the fluid meter.

Preferably, the fluid meter complies with the European Union Directive 2014/32/EU regarding the measuring instruments, better known by the acronym MID for "Measuring Instruments Directive". Particularly, the fluid meter must be able to permanently communicate information relating to the metrological data. Likewise, the fluid meter must be able to carry out the metrological measurements at any time. Consequently, the fluid meter must have an electrical supply permanently.

For this purpose, the fluid meter comprises a power supply block 10 configured to permanently supply electricity to the control block 6, and an electric generator 12 configured to be driven by the circulation of the fluid in the pipe and generate electricity, the power supply block 10 being coupled to the electric generator 12.

At least part of the electric generator 12 is disposed in the pipe 2 in contact with the fluid in order to take mechanical energy and convert it into electricity. Typically, this electric generator 12 is a turbine, preferably with fins, integrating a rotor and a stator. The electric generator 12 provides electricity available outside the pipe. Preferably, the electric generator 12 is disposed downstream, in the direction of circulation of the fluid, relative to the metrological sensor 4 in the fluid pipe, so as not to disturb these metrological measurements.

The power supply block 10 comprises two distinct and independent paths: a first supply path 14 comprising at least one primary cell 16 and a second supply path 20 connected to the electric generator 12. By "primary cell" it is meant an electrical energy storage element such as a battery that cannot be recharged, or whose configuration in the power supply block 10 makes the charging within this power supply block 10 impossible. Typically, the first supply path 14 comprises only the primary cell 16. The primary cell 16 preferably has a maximum energy reserve of less than 100 Wh, such as for example 30.6 Wh (8.5 Ah on 3.6 V) or 68.4 Wh (19 Ah on 3.6 V).

The second supply path 20 comprises a capacitor C1 and a first switch S1 configured to selectively couple or decouple the capacitor C1 and the electric generator 12. The capacitor C1 preferably has a maximum energy reserve $E_{max}$ greater than or equal to 0.5 Wh, and even preferably greater than or equal to 0.8 Wh. For example, the capacitor C1 can deliver an electric charge of 0.222 Ah on 3.6 V. The capacitor C1 is preferably a supercapacitor. Typically, the capacitor C1 can be a hybrid layer supercapacitor, or HLC for Hybrid Layer Capacitor, but can also be any type of supercapacitor making it possible to offer a maximum energy reserve $E_{max}$ greater than or equal to 0.5 Wh. Preferably, the maximum energy $E_{max}$ of the capacitor C1 is less than at least 20 times the maximum energy of the primary cell 16.

The first switch S1 is disposed between the capacitor C1 and the electric generator 12. The first switch S1 is controlled by the control block 6 for its opening and its closure. The first switch S1 is preferably a relay, for example an electromechanical relay.

The second supply path 20 can comprise, in series between the electric generator 12 and the first switch S1, different current shaping elements, and for example a rectifier 22 in series with a voltage regulator 24. The power supply block 10 further comprises a current sensor 26 configured to determine a current measurement representative of an intensity of the charge or discharge current of the capacitor C1. In the example illustrated, a first terminal of the capacitor C1 is connected between the first switch S1 and the second switch S2 (at this connection point, it is considered that the voltage V between said connection point and the reference potential to which the resistor R1 is connected is known by design), and a second terminal of the capacitor C1 is connected in series with one terminal of the resistor R1, which is connected to a reference potential (e.g. the ground) via its other terminal. A measurement relating to the current passing through the resistor R1 is taken by the current sensor 26, typically a voltage $V_r$ across the resistor R1 from which a measurement of a signed current I (positive during the charging and negative during the discharging) can be derived once the resistance value of the resistor R1 is known. Thus, the current sensor 26 can be a voltmeter. The resistance value of the resistor R1 can be low, and is for example less than 800 mΩ.

The current sensor 26 transmits its measurement to the control block 6. Preferably, the current measurement is an average of the intensity values taken during a period of time, typically during a time step.

The power supply block 10 further comprises a second switch S2 configured to selectively couple the first supply path 14 or the second supply path 20 to the control block 6, thus selecting whether the control block 6 is electrically powered by the first supply path 14 or the second supply path 20.

The first switch S1 and the second switch S2 are controlled by the control block 6 for their state: open or closed for the first switch S1, selection of the supply path for the second switch S2. When the first switch S1 is closed and the second switch S2 connects the control block 6 to the primary cell 16, which then powers the control block 6, the capacitor C1 is coupled to the electric generator 12 and recharges, storing electrical energy. When the first switch S1 is open and the second switch S2 connects the control block 6 to the capacitor C1 of the second supply path 20, the control block 6 is powered by the capacitor C1, the primary cell 16 not being loaded.

The first switch S1 and the second switch S2 are configured to be monitored by the control block 6 as a function of a state of charge of the capacitor C1 determined by the control block 6 from the current measurement. The control block 6 is indeed configured to determine a state of charge (SoC) of the capacitor C1 from the measurement of the current. More specifically, the state of charge is updated at each time step thanks to the measurement of the current. For example, during the charging of the capacitor C1, the state of charge (SoC) at the previous instant is incremented by a multiple of the square of the intensity of the current, more specifically by the product of the intensity of the current I and of the voltage V decremented by the voltage across the resistor R1 by the intensity of the current.

Preferably, the state of charge is expressed as a proportion of a maximum energy reserve $E_{max}$ of the capacitor C1. It follows that the expression for energy, i.e. $(V-R_1 \cdot I) \cdot I$, is divided by $E_{max}$, with $R_1$ the resistance value of resistor $R_1$, and therefore that $SoC(t+T)=SoC(t)+T \cdot ((V-R_1 \cdot I) \cdot I/E_{max}$. During the discharging of the capacitor C1, the state of charge (SoC) at the previous instant is decremented by a multiple of the square of the current, namely incremented by the product of the intensity of the current and of the voltage V decremented by the voltage across the resistor $R_1$ (which is negative in this case) by the intensity of the current (which is also negative), hence $SoC(t+T)=SoC(t)+T \cdot (V-R_1 \cdot I) \cdot I/E_{max}$. Preferably, the time step T is less than 10 seconds. The time step T is preferably more than 0.1 second. For reasons of simplicity, the time step here is 1 second, which simplifies the determination of the state of charge:

in charge: $SoC(t+T)=SoC(t)+(V-R_1 \cdot I) \cdot I/E_{max}$, in discharge: $SoC(t+T)=SoC(t)+(V-R_1 \cdot I) \cdot I/E_{max}$, If the state of charge is sufficiently high, the second switch S2 connects the second supply path 20 to allow the supply of the control block 6 by the capacitor C1 of the second supply path 20. Otherwise, the second switch S2 connects the first supply path 14 to allow the recharging of the capacitor C1 while it is the primary cell 16 of the first supply path 14 that powers the control block 6. The control block 6 is configured, at least when the electric generator 12 generates electricity:

to open the first switch S1 and position the second switch S2 on the second supply path 20 when the state of charge becomes greater than a high threshold, to close the first switch S1 and position the second switch S2 on the first supply path 14 when the state of charge of the capacitor C1 becomes smaller than a low threshold.

The estimation of the state of charge from the current measurement is more accurate than other approaches, for example based on the voltage across the capacitor C1, and therefore allows making the most of the storage capacities of the capacitor C1.

Figure 2:
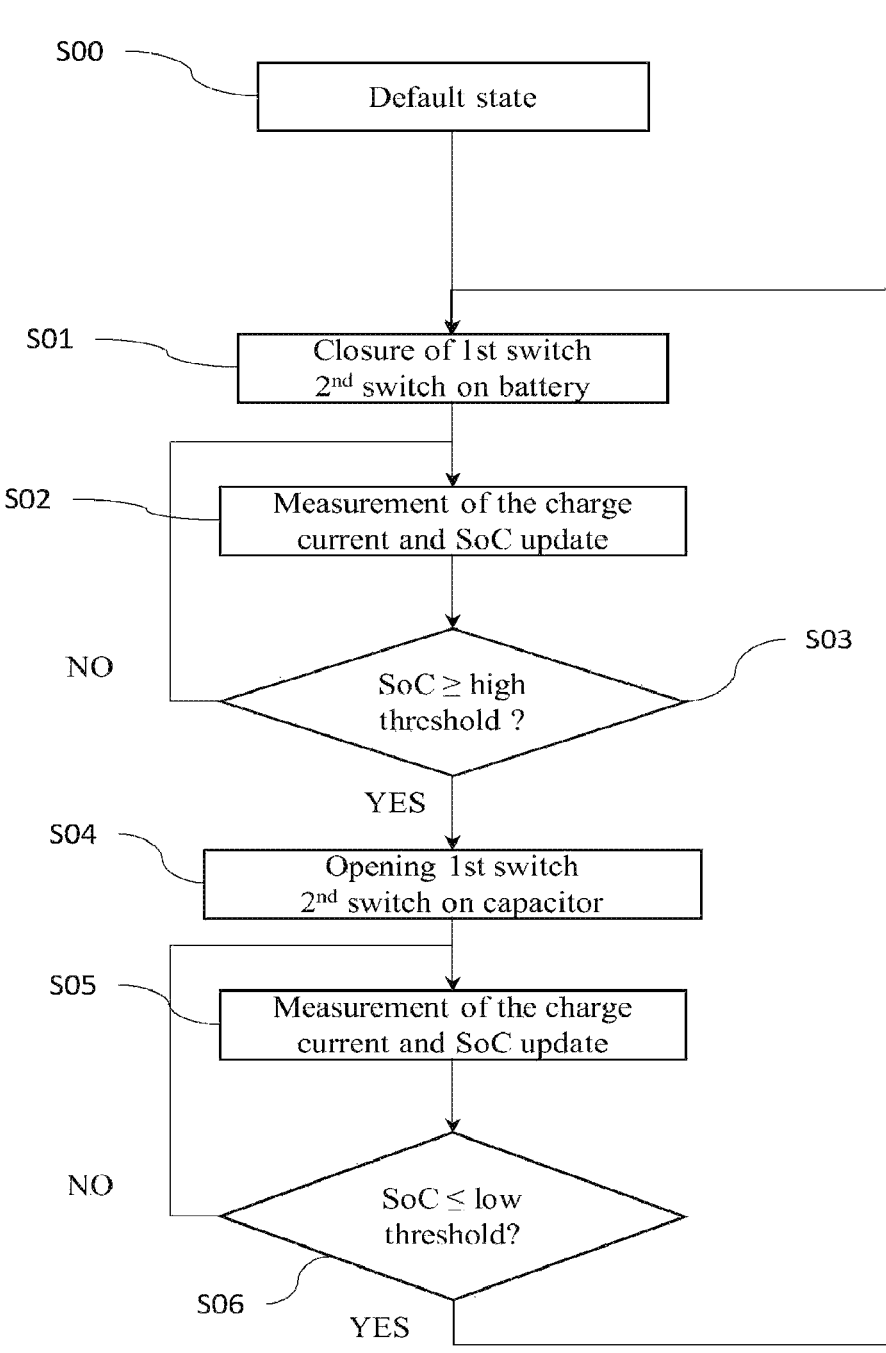
FIG. 2 is a fluid meter implementation diagram according to one possible embodiment of the invention.

FIG. 2 shows an example of a fluid meter operation diagram showing the variations in the states of the first switch S1 and of the second switch S2, with different steps implemented by the control block 6. In a default state (S00), for example before the installation of the fluid meter, the second switch S2 is on primary cell 16, that is to say connects the control block 6 to the first supply path 14. The first switch S1 is preferably closed. The charge of the capacitor C1 may be zero or very low. The default state can for example be maintained until a non-zero charge current is detected by the current sensor 26.

In a first step (S01), the first switch S1 is closed, connecting the capacitor C1 to the electricity generator. The second switch S2 is on primary cell 16. The capacitor C1 can then be charged with electrical energy. In a second step (S02), the charge current is measured via the current sensor 26, and the state of charge is updated based on the measurement of the charge current. More specifically, as explained above, the state of charge is incremented by a multiple of the square of the intensity of the charge current. Then, a test (S03) is performed to check whether the state of charge is greater than a high threshold, by means of a comparison between the current state of charge and this high threshold. The high threshold is used to check that the capacitor C1 is sufficiently charged, and therefore corresponds to a state of charge close to the maximum energy $E_{max}$ that the capacitor can store. Typically, the high threshold is at least 80% of the maximum energy $E_{max}$, and preferably at least 90% of the maximum energy $E_{max}$.

If this is not the case, the control block 6 returns to the second step (S02) to continue the charging of the capacitor C1. If the state of charge is greater than the high threshold, then the control block 6 controls the opening of the first switch S1 and the passage of the second switch S2 on the capacitor C1, thus coupling the control block 6 and the second supply path 20. The control block 6 is now powered by the capacitor C1 which discharges, and no longer by the primary cell 16. The opening of the first switch S1 makes it possible to decouple the capacitor C1 and the electric generator 12 thus avoiding possible electrical disturbances. During the discharge of the capacitor C1, at each time step, a step (S05) of measuring the discharge current and an update of the state of charge are performed. More specifically, as explained above, the state of charge is decremented by a multiple of the square of the intensity of the discharge current. Then, a test (S06) is carried out to check whether the state of charge is smaller than a low threshold, by means of a comparison between the current state of charge and this low threshold. The low threshold is used to check that the capacitor C1 has been sufficiently discharged, and therefore corresponds to a state of charge close to the minimum. Typically, the low threshold is less than 10% of the maximum energy $E_{max}$, and is for example less than or equal to 5% of $E_{max}$.

If the state of charge is greater than the low threshold, the discharge of the capacitor C1 continues and a new step (S05) of measuring the discharge current and updating the state of charge is performed. If the state of charge is smaller than or equal to the low threshold, this means that capacitor C1 has been sufficiently discharged, and that it must now be recharged. Consequently, the control block 6 then returns to step (S01), closes the first switch S1 and switches the second switch S2 to the first supply path 14, on the primary cell 16.

As visible in this method, the control block 6 is configured to maximize the use of the capacitor C1 and save the primary cell 16. The primary cell 16 is then only used to allow the recharging of the capacitor C1. Thanks to the permanence of the electrical supply, the fluid meter is capable of communicating information relating to the metrological data, for example by displaying them, even in the absence of fluid circulation. It should be noted that the charging time of the capacitor C1 is inversely proportional to the rotation speed of the turbine. It is easy to ensure, given the low energy requirements of the control block 6, that the recharging time of the capacitor C1 is much shorter than the discharging time of the capacitor C1. The capacitor C1 can ensure a significant part of the supply to the control block 6. The primary cell 16, less loaded, can be chosen with a lower energy storage capacity, with consequently reduced bulk and lower cost, while preserving or increasing its service life.

The invention is not limited to the embodiment described and represented in the appended figures. Modifications remain possible, particularly from the point of view of the constitution of the various technical characteristics or by substitution of technical equivalents, without departing from the field of protection of the invention.

The invention claimed is:

1. A fluid meter configured to perform metrological measurements in a fluid circulation pipe and to communicate information relating to said metrological data, comprising:
   an electric generator configured to be driven by the circulation of the fluid in the fluid pipe and to generate electricity,
   at least one metrological sensor configured to perform metrological measurements in the fluid pipe,
   a control block configured to receive the metrological measurements and to communicate information relating to said metrological data,
   a power supply block coupled to the electric generator, and configured to supply energy to the control block, in which the power supply block comprises a first supply path comprising at least one primary cell, and a second supply path connected to the electric generator, the second supply path comprising a capacitor and a first switch configured to selectively couple the capacitor and the electric generator, the power supply block further comprising a second switch configured to selectively couple the first supply path or the second supply path to the control block,
   the power supply block further comprising a current sensor configured to determine a current measurement representative of an intensity of a charge or discharge current of the capacitor,
   the first switch and the second switch being configured to be monitored by the control block according to a state of charge of the capacitor determined by the control block from the current measurement.

2. The fluid meter according to claim 1, wherein the control block is configured to, at least when the electric generator generates electricity:
   open the first switch and position the second switch on the second supply path when the state of charge becomes greater than a high threshold,
   close the first switch and position the second switch on the first supply path when the state of charge of the capacitor becomes smaller than a low threshold.

3. The fluid meter according to claim 2, wherein the high threshold is greater than or equal to 80% of a maximum state of charge, and the low threshold is less than or equal to 10% of a maximum state of charge.

4. The fluid meter according to claim 1, wherein the control block is configured to update a previous state of charge with a multiple of a square of the intensity of the current at each time step.

5. The fluid meter according to claim 1, wherein the state of charge is expressed as a proportion of a maximum energy reserve of the capacitor.

6. The fluid meter according to claim 5, wherein the control block is configured to update at each time step a previous state of charge with a product of the intensity of the current and of the voltage between a first terminal of the capacitor between the first switch and the second switch and the reference potential, said voltage being decremented by the voltage across the resistor by the intensity of the current.

7. The fluid meter according to claim 1, comprising a resistor in series between the capacitor and a reference voltage, and the measurement of the current is determined from a voltage across the terminals of the resistor.

8. The fluid meter according to claim 1, wherein the capacitor has a terminal coupled to a terminal of the first switch and to a terminal of the second switch.

9. The fluid meter according to claim 1, wherein the communication of the information relating to the metrological data is performed by display on a screen and/or by transmission of said metrological data.

10. The fluid meter according to claim 1, wherein the first supply path and the second supply path are independent.

11. The fluid meter according to claim 1, wherein the primary cell is an electrical energy storage element that cannot be recharged or whose configuration in the power supply block makes the charging within this power supply block impossible.

\* \* \* \* \*